(12) United States Patent
Roka (10) Patent No.: US 8,897,759 B2
(45) Date of Patent: Nov. 25, 2014

(54) SYSTEMS AND METHODS FOR DYNAMICALLY FORWARDING WIRELESS COMMUNICATIONS ON MOBILE COMMUNICATIONS DEVICES

(75) Inventor: Pujan K. Roka, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 501 days.

(21) Appl. No.: 12/943,419

(22) Filed: Nov. 10, 2010

(65) Prior Publication Data
US 2012/0115451 A1 May 10, 2012

(51) Int. Cl.
*H04W 4/00* (2009.01)
*H04M 3/42* (2006.01)
*H04W 4/16* (2009.01)
*H04W 4/02* (2009.01)
*H04M 3/54* (2006.01)
*H04W 4/20* (2009.01)

(52) U.S. Cl.
CPC ............. *H04W 4/025* (2013.01); *H04W 4/027* (2013.01); *H04M 3/42263* (2013.01); *H04M 3/54* (2013.01); *H04M 3/42365* (2013.01); *H04M 3/42* (2013.01); *H04W 4/20* (2013.01); *H04W 4/16* (2013.01)

USPC ........ 455/417; 455/445; 455/466; 455/412.2; 455/414.1; 455/414.2

(58) Field of Classification Search
USPC ................. 455/417, 445, 466, 412.2, 461
See application file for complete search history.

(56) References Cited

U.S. PATENT DOCUMENTS

| 2005/0164686 A1* | 7/2005 | Bushnell et al. | 455/417 |
| 2009/0305683 A1* | 12/2009 | Gupta et al. | 455/417 |
| 2011/0307891 A1* | 12/2011 | Orr et al. | 718/100 |

* cited by examiner

*Primary Examiner* — Michael T Vu
(74) *Attorney, Agent, or Firm* — Sutherland Asbill & Brennan LLP (57) ABSTRACT

Embodiments of the invention provide systems and methods for dynamically forwarding incoming calls and/or messages to different mobile communications devices ("MCDs"). In one embodiment, a method may include: storing associations between multiple MCDs and a user and identifying that at least one of the MCDs is inactive and that at least one of the MCDs is active. The method may further include: receiving an incoming call or message intended for the at least one inactive MCD; and if only one of the MCDs is active, causing the incoming call or message to be forwarded to the one active MCD; and if more than one of the MCDs is active, either: (a) causing the incoming call or message to be forwarded to at least one of the active MCDs or (b) not causing the incoming call or message to be forwarded.

20 Claims, 7 Drawing Sheets

MCD List

| Primary | Priority | MCD ID | Other Data |
|---------|----------|------------|------------|
| X | 1 | 1234561111 | |
| | 2 | 1234561022 | |
| | 3 | 9876549987 | |
| | ... | | |
| | n | 6458761234 | |

SYSTEMS AND METHODS FOR DYNAMICALLY FORWARDING WIRELESS COMMUNICATIONS ON MOBILE COMMUNICATIONS DEVICES

FIELD OF THE INVENTION

Aspects of the invention relate generally to wireless communications, and more particularly, to systems and methods for dynamically forwarding wireless communications on mobile communications devices.

BACKGROUND OF THE INVENTION

With the proliferation of wireless technologies, many people carry more than one mobile communications device (e.g., cellular phones, smart phones, etc.). Different mobile communications devices ("MCDs") may be used at different times, for different locations, or for different purposes. For example, some individuals may choose to utilize both a personal MCD and a separate work-related MCD. Some wireless operators provide call forwarding features to forward calls from one device to another. However, these call forwarding capabilities are unintelligent and require user activation of the feature and designation of the receiving device each time the service is desired to be activated or each time a different device is to receive forwarded messages.

Therefore, a need exists for systems and methods that allow dynamic call or message forwarding on mobile communications devices.

BRIEF DESCRIPTION OF THE INVENTION

Some or all of the above needs and/or problems may be addressed by certain embodiments of the invention. Embodiments of the invention may include systems and methods for dynamically forwarding incoming calls and/or messages to different MCDs. In one embodiment, a method for forwarding wireless communications is provided. The method may include: storing associations between multiple MCDs and a user and identifying that at least one of the MCDs is inactive and that at least one of the MCDs is active. The method may further include: receiving an incoming call or message intended for the at least one inactive MCD; and if only one of the MCDs is active, causing the incoming call or message to be forwarded to the one active MCD; and if more than one of the MCDs is active, either: (a) causing the incoming call or message to be forwarded to at least one of the active MCDs or (b) not causing the incoming call or message to be forwarded.

According to another embodiment, computer-readable media having computer program instructions which when executed by an MCD processor cause the MCD processor to: analyze one or more activity status indicators to facilitate determining whether the MCD is active or inactive; determine an MCD activity status based at least in part on the one or more activity status indicators; and transmit the MCD activity status to a wireless operator system for forwarding incoming calls or messages based at least in part on the MCD activity status.

According to yet another embodiment, a system for forwarding wireless communications is provided. The system may include at least one server comprising one or more computer processors and a call and message forwarding module. The call and message forwarding module can be operable to: associate multiple MCDs with a user; identify that at least one of the MCDs is inactive; identify that at least one of the MCDs is active; receive notification of an incoming call or message intended for the inactive MCD; if only one of the MCDs is active, cause the incoming call or message to be forwarded to the one active MCD; and if more than one of the MCDs is active, either (a) cause the incoming call or message to be forwarded to at least one of the active MCDs or (b) not cause the incoming call or message to be forwarded.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems and methods for dynamically forwarding incoming calls and/or messages (e.g., short messages service ("SMS") messages, mobile message service ("MMS") messages, voice messages, etc.) between mobile communications devices. As discussed, users may utilize more than one MCD (e.g., a mobile phone, a smart phone, a pager, a mobile email/phone device, etc.) and, thus, may desire a technique for forwarding calls from a first MCD to one or more other MCDs when the first MCD is not being utilized. Providing techniques for dynamically handling and forwarding incoming calls or messages from an inactive MCD to one or more active MCDs minimizes the configuration and activation efforts required of the users. Dynamically identifying active and inactive statuses of MCDs can be quite instrumental in more effectively delivering incoming live calls and messages for users who frequently switch between MCDs.

According to one embodiment, a wireless operator system may register an association of a user to multiple MCDs so that the user can have incoming voice calls and/or messages forwarded. Typically, each of these MCDs will have a unique phone number associated therewith. The wireless operator system may periodically monitor and update the activity status of each of those MCDs to determine whether incoming voice calls or messages initially directed to one phone number (corresponding to one MCD) on the list should be redirected and forwarded to a different phone number (corresponding to a different MCD). MCD activity may be determined in any number of ways, including, but not limited to, accelerometer activity, user activity, global positioning system ("GPS") data, mobile IP deregistration, MCD power status, and the like, which is described in more detail herein. The activity status may be monitored periodically, providing the wireless operator system with up-to-date status information for each MCD associated with a user to allow performing the proper call or message forwarding operations.

According to various embodiments, a user may populate the MCD registration list with the phone numbers (and thus the corresponding MCDs) which are desired to receive calls. In some embodiments, the user can also prioritize the order in which the MCDs should be considered as potential recipients for the forwarded call or message. For example, a user may designate one MCD and phone number as a primary device which, when active, should receive any calls or messages that are to be forwarded. When the primary MCD is determined to be inactive, an incoming call or message that is to be forwarded can be forwarded to the next active MCD in the list according to the designated order of priority. According to other embodiments, an incoming call or message may be forwarded to an active MCD only when one MCD is indicated as active, irrespective of the order of priority. In another embodiment, an incoming call or message may be forwarded to more than one MCD, such as if multiple MCDs are active, as configured by the user or otherwise provided for by the system. If no MCDs are indicated as active, an incoming call may be handled by a voicemail account associated with the originally intended MCD and/or to any other voicemail account associated with the user. Similarly, if a message (e.g., SMS, MMS, voice, etc.) is being transmitted, the message may be transmitted to the originally intended MCD and/or to any other MCD (e.g., primary MCD, etc.). Voicemails or other messages may also be stored for or otherwise provided to multiple MCDs if configured accordingly. It is appreciated that a number of other forwarding options may be provided, such as those described by example in more detail herein.

More details regarding the various means for implementing the embodiments of the invention are provided below with reference to FIGS. 1-7.

System Overview

An example system 100 will now be described illustratively with respect to FIG. 1. The system 100 may include one or more wireless operators and associated wireless operator systems 102, multiple mobile communications devices ("MCDs") 104, at least one user computer 106, one or more wireless networks 108, and one or more other networks 112 (e.g., the Internet, wide area network, local area network, private network, public network, etc.). Each of the aforementioned systems or system components is configured for accessing and reading associated computer-readable media having data stored thereon and/or computer-executable instructions for implementing the various methods described herein. By executing computer-executable instructions, each of these computer systems may form a special purpose computer or a particular machine. As used herein, the term "computer-readable medium" may describe any form of computer memory or memory device.

The wireless operator system 102 may be one or more wireless operator systems, each associated with one or more suitable processor-driven devices that facilitate dynamically forwarding voice calls and/or messages between MCDs. The wireless operator system 102 may be, but is not limited to, a server computer, a mainframe computer, one or more networked computers, a desktop computer, a personal computer, an application-specific circuit, a microcontroller, a minicomputer, or any other processor-based device or any combination thereof. The execution of suitable computer-executable instructions by the wireless operator system 102 may form a special purpose computer or other particular machine that is operable to facilitate dynamically forwarding voice calls and/or messages to different MCDs than originally intended, as discussed herein. Although a single wireless operator system 102 is described herein, the operations and/or control of the wireless operator system 102 may be distributed among any number of computers and/or processing components. Moreover, in some instances, the operations described herein may be performed by multiple wireless operator systems 102, such as if different wireless operators are involved in the transmission of the voice calls or messages.

Details of the wireless operator system 102 are described with reference to FIG. 2, which illustrates a schematic view of an example computer system, according to one embodiment. The wireless operator system 102 thus includes one or more processors 225, one or more memory device(s) 205, one or more input/output ("I/O") interface(s) 240, and one or more network interface(s) 245, communicating over a data communications bus 230. The memory device 205 may be any suitable memory device, for example, caches, read-only memory devices, random access memory devices, magnetic storage devices, removable storage devices, etc. Additionally, any number of logical data storage constructs may be stored as desired within the memory device 205, such as any number of suitable databases. The memory device 205 may further store a wide variety of data 215, such as registration information associating users to MCDs, phone numbers, user information, MCD information, forwarding prioritization, carrier information, and the like. Additionally, the memory device 205 may store executable programmed logic instructions 210 and/or various program modules utilized by the wireless operator system 102, including, but not limited to, an operating system 220, a call and message forwarding module, and a configuration module, such as are described in more detail herein. The operating system 220 may be a suitable software module that controls the general operation of the wireless operator system 102, and may also facilitate the execution of other programmed logic instructions 210 by the one or more processors 225, for example, the call and message forwarding module and the configuration module. The operating system 220 may be, but is not limited to, Microsoft Windows®, Apple OSX™, Linux, Unix, or a mainframe operating system.

Figure 1:
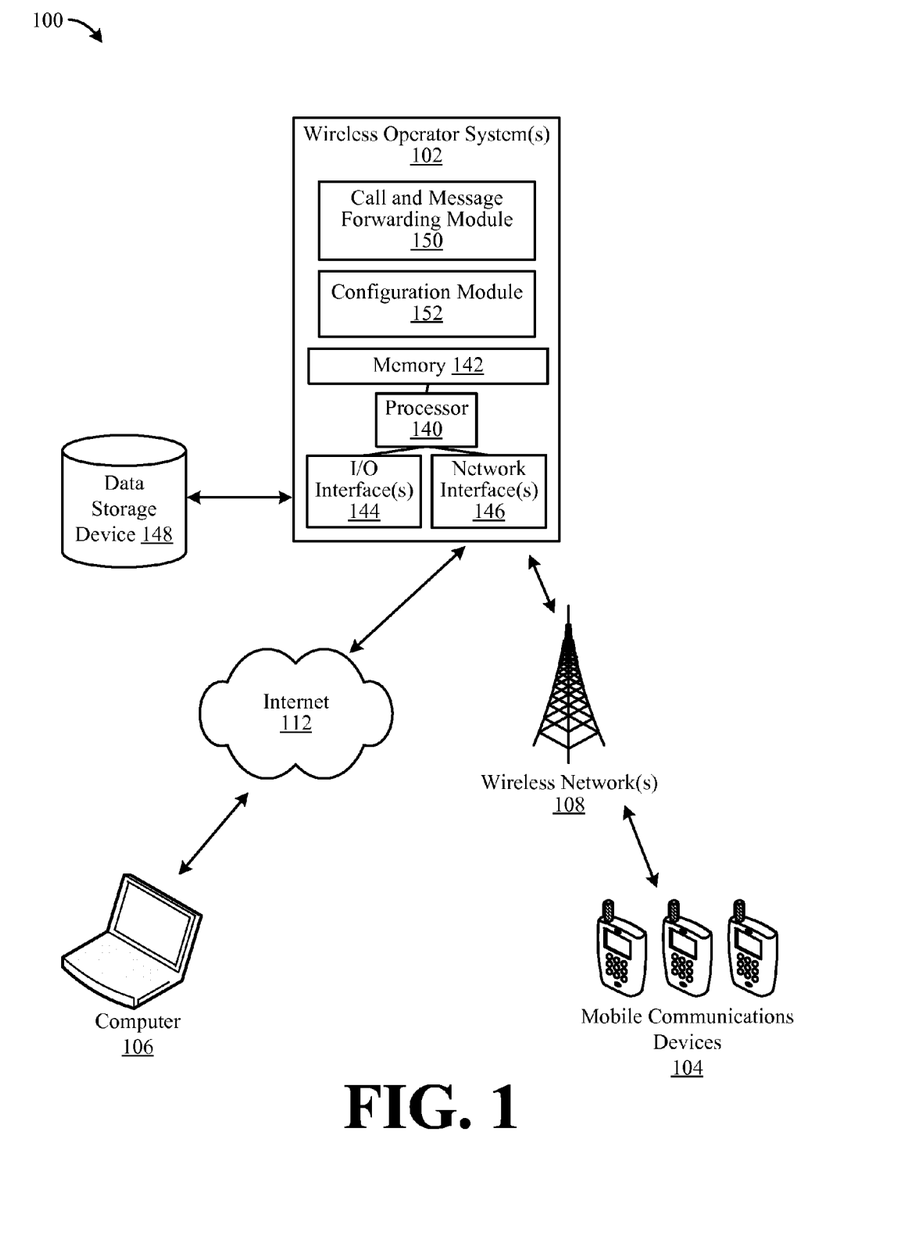
FIG. 1 illustrates an example system, according to an example embodiment of the invention.
Figure 2:
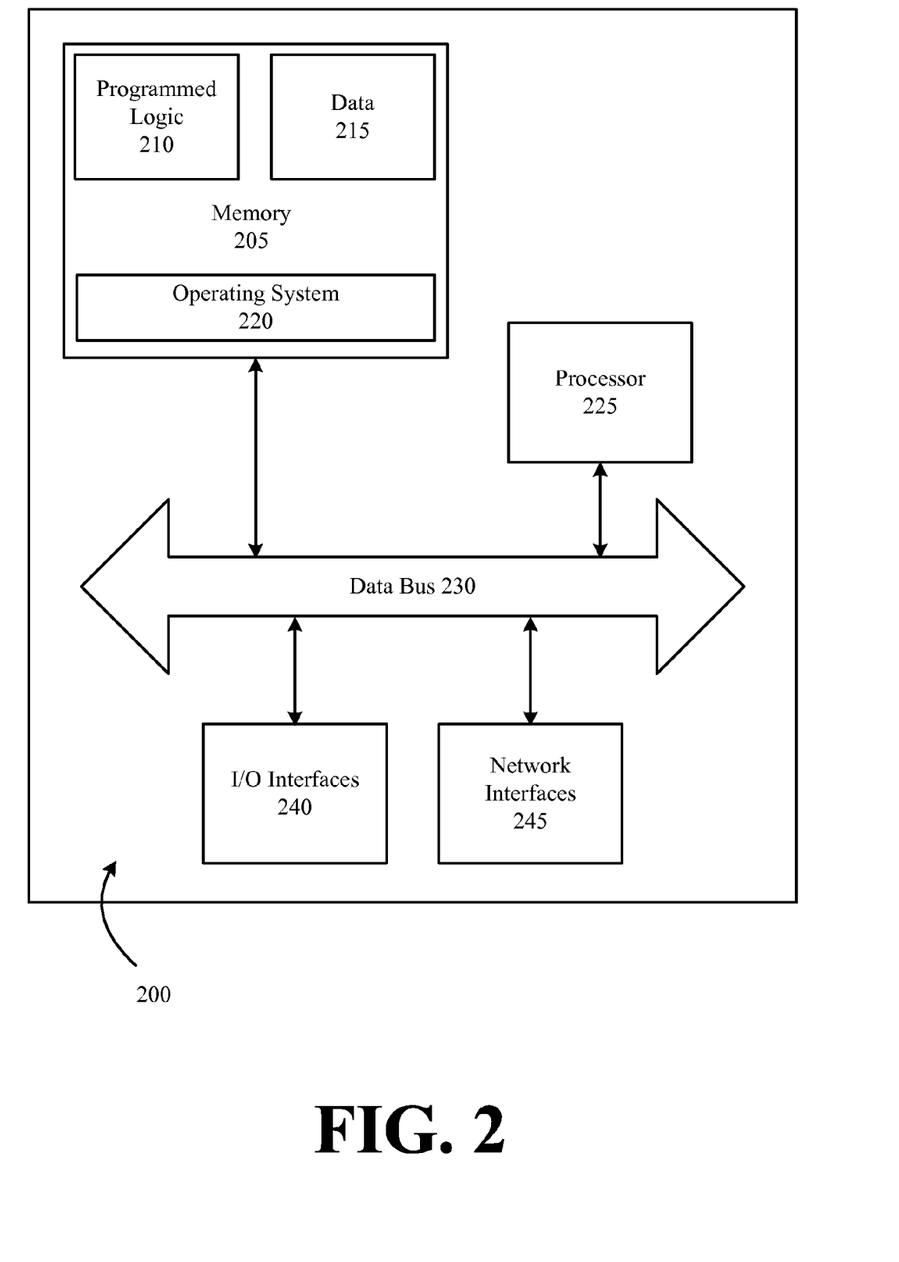
FIG. 2 is a schematic diagram of an example computer system, according to an example embodiment of the invention.

With continued reference to the example wireless operator system 102 illustrated by FIG. 2, the one or more I/O interfaces 240 may facilitate communication between the wireless operator system 102 and one or more input/output devices, for example, one or more user interface devices, such as a display, keypad, mouse, pointing device, control panel, touch screen display, remote control, microphone, speaker, etc., that facilitate user interaction with the wireless operator system 102. The one or more network interfaces 245 may facilitate connection of the wireless operator system 102 to one or more suitable networks, for example, the Internet 112 and/or the wireless network 108 illustrated in FIG. 1. In this regard, the wireless operator system 102 may receive and/or communicate information to other components of the system 100, such as the MCDs 104, the user computers 106, other wireless operator systems 102, and/or other components conventionally associated with wireless communications networks.

With continued reference to FIG. 1, the wireless operator system 102 includes a call and message forwarding module 150 and a configuration module 152. The call and message forwarding module 150 may be operable to manage the association of users to MCDs, to analyze MCD activity status, and to facilitate forwarding incoming voice calls and/or messages according to the activity statuses of users' MCDs. The configuration module 152 may be operable to present a user interface to, and to receive user instructions from, a user for associating multiple MCDs with a user's profile, prioritizing the multiple MCDs for call or message forwarding priority, and defining or altering any other configuration data as desired. The call and message forwarding module 150 and the configuration module 152 may communicate with, or otherwise be operable with, one or more home location registers ("HLRs") of the wireless operator system 102. The HLR is generally operable to manage subscriber (e.g., users of the wireless operator system's 102 services) information, such as, but not limited to, subscriber identity module ("SIM") information, which may include, but is not limited to, international mobile subscriber identities ("IMSI") uniquely identifying SIM cards or mobile devices and mobile subscriber integrated services digital network numbers ("MSISDN"), which are the telephone number (or numbers) assigned to the SIM card. In addition the HLR may be operable to manage and store GSM services information, general packet radio services ("GPRS") information, current location information, and the like. Accordingly, the HLR can be accessed to facilitate forwarding incoming voice calls and/or messages. Each of these modules will be discussed in more detail below with reference to the various embodiments for dynamically forwarding incoming voice calls or messages between MCDs. It is appreciated that the aforementioned features of the wireless operator system 102 are provided for illustrative purposes only and are not intended to be limiting.

Each of the multiple MCDs 104 are operable for communication over one or more wireless networks 108. To participate in the service, each user should register at least two MCDs but may register any number greater than two, according to various embodiments. An MCD 104 may be any device operable for wireless communications (e.g., cellular, Wi-Fi Internet communications, WiMAX network communications, and the like), such as, but not limited to, a mobile phone, a pager device, a smart phone, a mobile email/phone device, a personal device assistant, or any other suitable portable device operable for receiving and transmitting wireless voice and/or message communications. Accordingly, each MCD 104 is associated with a wireless operator system 102 (also referred to as a "subscriber" of the wireless operator), and communicates at least partially over the wireless network(s) 108 operated by the wireless operator system 102. When MCDs 104 that subscribe to one wireless operator system 102 are communicating with MCDs 104 that subscribe to another wireless operator system 102, then, typically, communications are transmitted between the MCDs 104 over both respective wireless networks 108.

Details of the MCDs 104 are described with reference to FIG. 3, which illustrates a schematic view of an example MCD 104, according to one embodiment. Each MCD 104 includes a memory 305, a processor 325, a transceiver 355, and a Subscriber Identity Module ("SIM") card 360 (or any other means to uniquely store and identify the user/subscriber of the MCD), each in communication over one or more data communications buses 330. The memory 305 may be any suitable memory device, for example, caches, read-only memory devices, random access memory devices, magnetic storage devices, removable storage devices, etc., and may be operable to store programmed logic 310, data 315, and an operating system 320. Some MCDs 104 may include multiple memory components, a built-in memory and a removable storage device. According to one example, the programmed logic 310 may include an activity status module configured for determining, at least in part, the activity status of the MCD 104. According to various embodiments, the activity status module may interact with, or otherwise receive data from, a GPS receiver 365, an accelerometer 370, and/or the I/O controller 340, or other operations of the MCD 104. As further described with reference to FIGS. 4-5, the activity status module may determine the activity status of the MCD 104 and/or communicate data utilized by the wireless operator system to determine the activity status of the MCD 104. The processor 325 (or processors) may be operable to execute the programmed logic 310 and the operating system 320, and may be any microprocessor, microcontroller, or any other processing device. The programmed logic may also include conventional programming instructions to perform incoming voice and data transmissions, outbound data and voice transmissions, to generate and display user interfaces and associated data, to generate user notifications, to receive instructions and commands from a user, and the like, as is generally performed by a conventional MCD 104. The transceiver 355 is operable for receiving and transmitting wireless signals, such as may be used for carrying voice and/or data (e.g., voice calls, SMS messages, MMS messages, mobile email, etc.). Example wireless transceivers 355 include, but are not limited to, radio frequency transceivers, IEEE 802.11-type (also referred to as Wi-Fi), Bluetooth, infrared, and the like. The GPS receiver 365 is in communication with the data communications bus 330 and operable to receive GPS signals from GPS satellite transmitters and communicate the same for operation by the programmed logic 310 for analyzing and utilizing GPS position data. The accelerometer assembly 370 is in communication with the data communications bus 330 and may be any conventional accelerometer system, such as a single-axis or multi-axis system, operable to detect the magnitude and direction of movement of the MCD 104; to generate orientation, direction, position, and other movement associated data; and to communicate this data for operation by the programmed logic 310 for analyzing and utilizing MCD 104 movement data. In addition, an input/output ("I/O") controller 340 is operable to facilitate control of input and output to and from the MCD 104 user, via the display 345 and the keypad 350, and, optionally, via other interface devices. The I/O controller 340 can thus be implemented in hardware, software, firmware, or any other combination thereof, and may include interface drivers, buffers, or interrupts to handle the input and output of audio, video, data, graphics, etc. The display 345 may be any display for displaying graphics, video, text, etc., on the MCD 104, such as, but not limited to, the screen (e.g., LCD), touchscreen, monitor, and/or other display. The keypad/entry component 350 may be any input device, such as, but not limited to, conventional phone-type keypad (e.g., 0-9 plus characters), QWERTY keypad, touchscreen interface, graffiti interface, and/or any other input device. It is appreciated that the aforementioned features of an MCD 104 are provided for illustrative purposes and are not intended to be limiting.

The wireless network 108 may be any wireless network operable for wireless communications operating under any cellular or other wireless network protocol (e.g., GSM, CDMA, TDMA, etc.). In addition, the wireless network 108 may provide MCDs 104 wireless access to the Internet 112, for example, to access the world wide web or to utilize HTTP communications sessions, such as when retrieving MMS messages and/or mobile emails. Due to network connectivity, various methodologies described herein may be practiced in the context of distributed computing environments. Although the system 100 is shown for simplicity as including one intervening wireless network 108 and Internet 112, it is to be understood that any other network configuration is possible, which may optionally include a plurality of networks, each with devices such as gateways and routers, for providing connectivity between or among networks.

Figure 3:
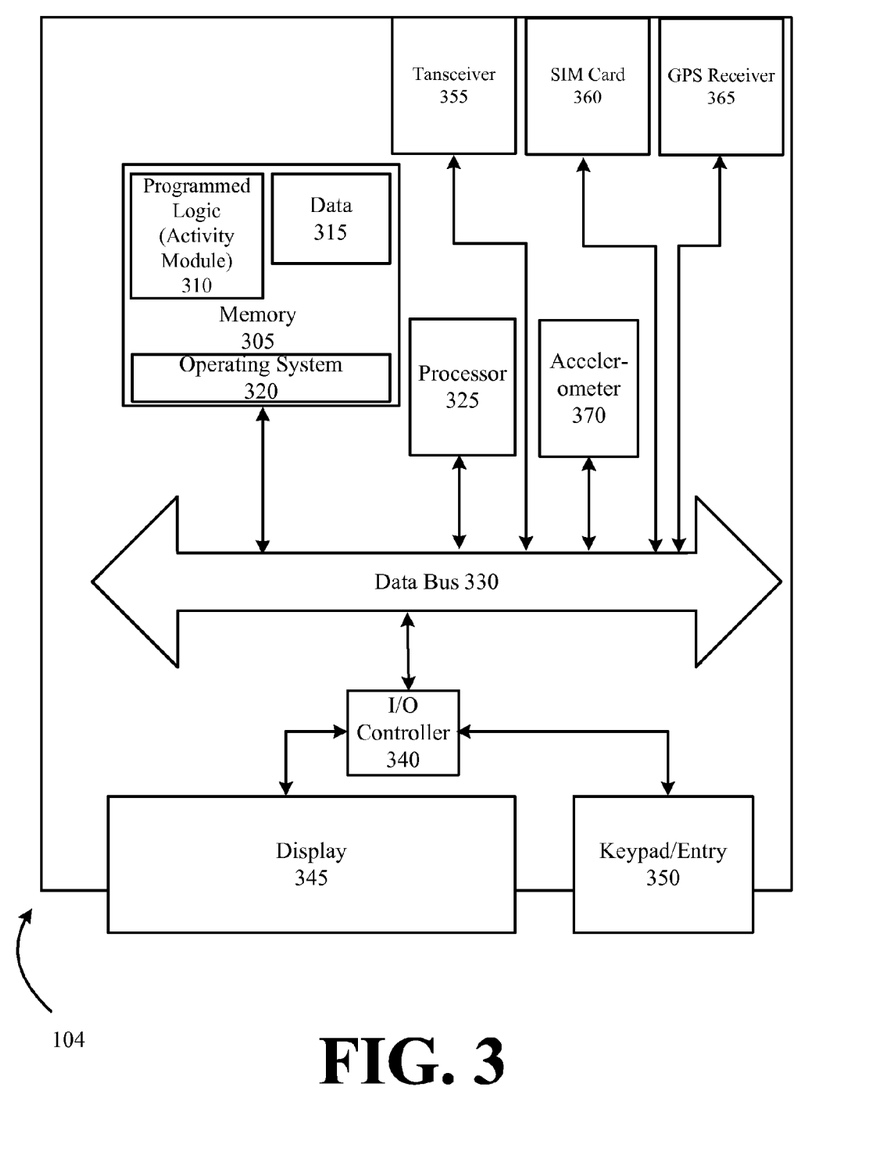
FIG. 3 is a schematic diagram of an example mobile communications device, according to an example embodiment of the invention.

The system 100 shown in and described with respect to FIGS. 1-3 is provided by way of example only. Numerous other operating environments, system architectures, and device configurations are possible. Accordingly, embodiments of the invention should not be construed as being limited to any particular operating environment, system architecture, or device configuration.

Operational Overview

Figure 4:
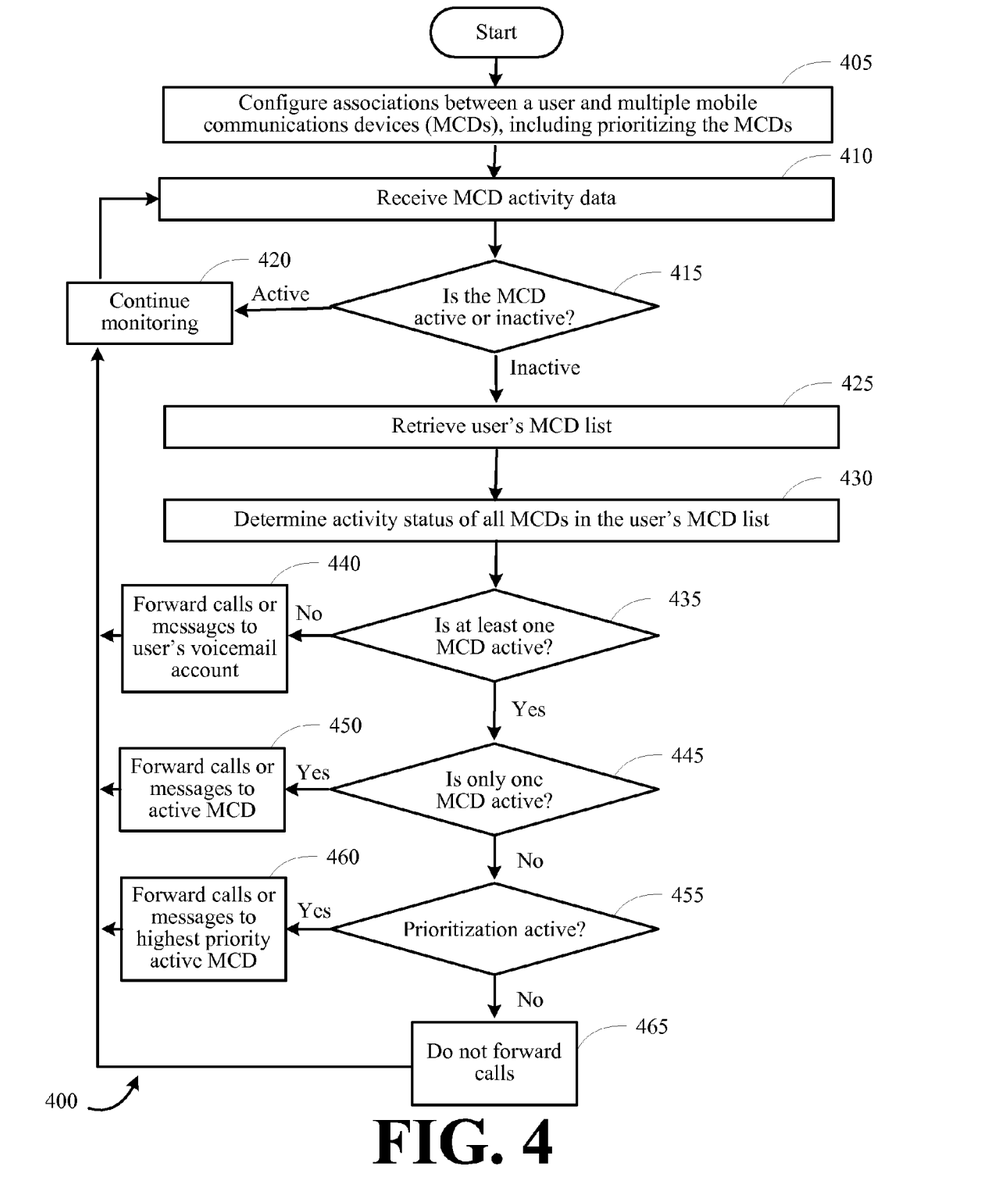
FIG. 4 is a flow diagram of an example method for dynamically forwarding incoming calls or messages between mobile communications devices, according to an example embodiment of the invention.
Figure 5:
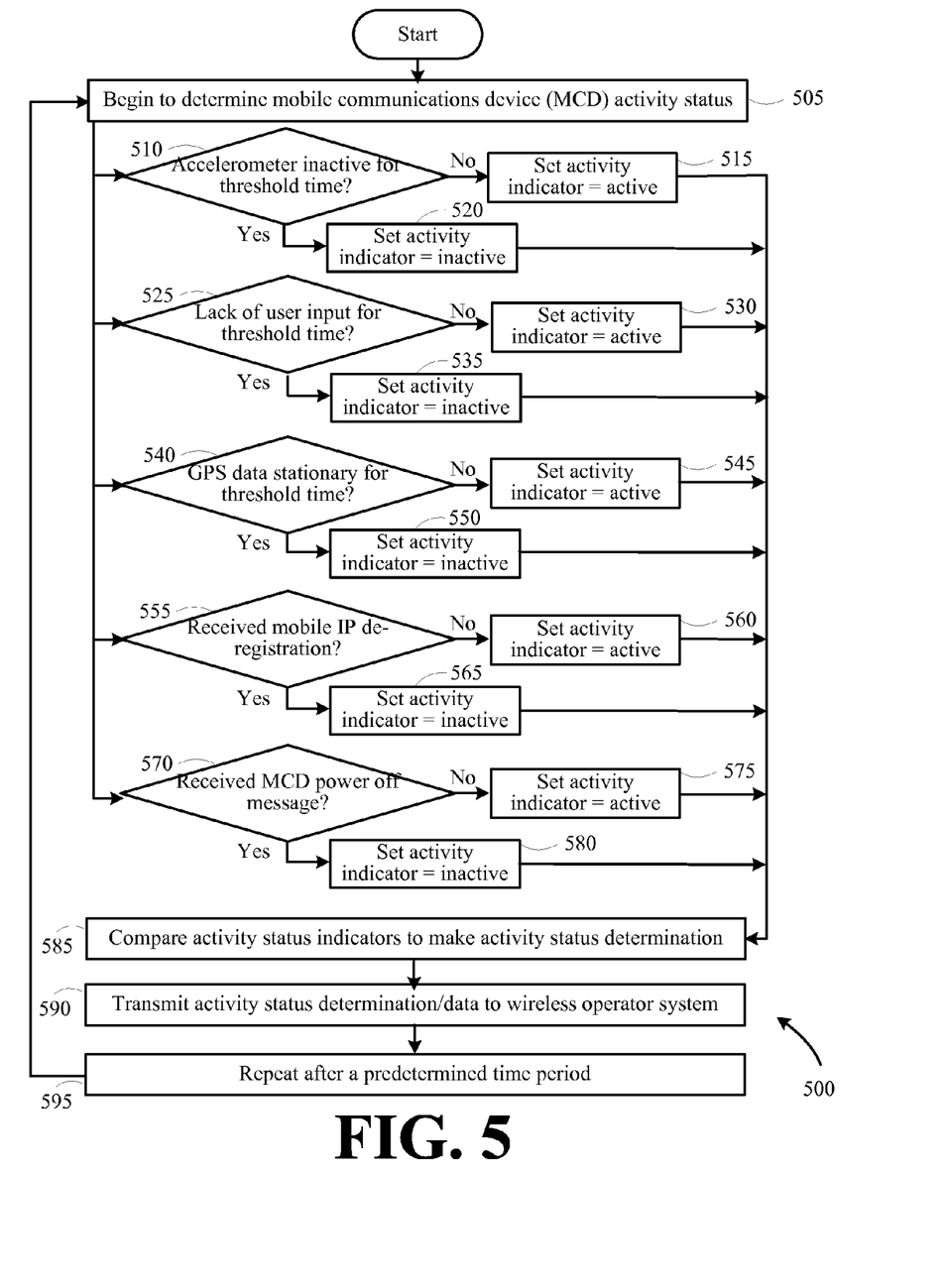
FIG. 5 is a flow diagram of an example method for determining the status of a mobile communications device, according to an example embodiment of the invention.
Figure 6:
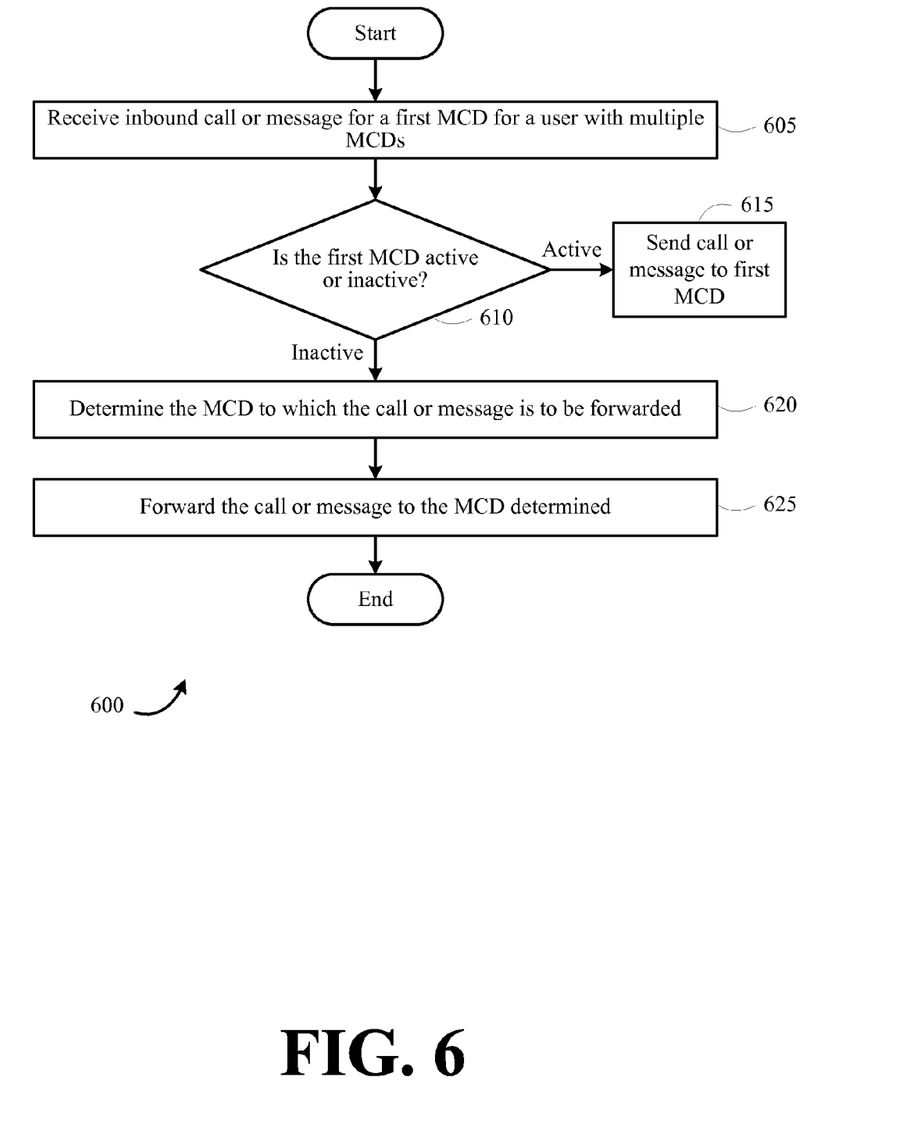
FIG. 6 is a flow diagram of an example method for forwarding an incoming call or message to a mobile communications device, according to an example embodiment of the invention.

FIGS. 4-6 represent flow diagrams of example methods 400, 500, 600 for forwarding incoming voice calls and/or messages, according to example embodiments. FIG. 4 illustrates a flow diagram of an example method 400 for designating one or more MCDs to which incoming calls or messages are to be forwarded, according to one embodiment. The method 400 may be performed, at least in part, by a wireless operator system of which the user is a subscriber, such as the wireless operator system 102 described with reference to FIGS. 1-2, which may include programmed logic, such as a configuration module and a call and message forwarding module, for implementing, at least in part, the operations of the method 400.

The method 400 may begin at block 405, in which associations between a user (or any number of users), who is a subscriber of the wireless operator, and multiple MCDs are configured. According to one embodiment, configuration may be performed at least in part by a user accessing a configuration module over a network, such as the Internet, to enter MCD information (or otherwise select from already registered MCD data) and configure call forwarding rules. According to various embodiments, access may be obtained using a computer, such as the computer 106 described with reference to FIG. 1, or using mobile Internet access from the user's MCD. As part of the entry, the user (or the wireless operator) may designate one of the multiple MCDs as the primary MCD to which calls or messages are to be forwarded if more than one MCD is active when forwarding calls or messages from the originally intended MCD. In addition, a user may prioritize the remaining MCDs, such as to designate the priority for forwarding calls or messages thereto if the primary MCD is inactive or if more than one MCD is active when forwarding calls or messages.

Figure 7:
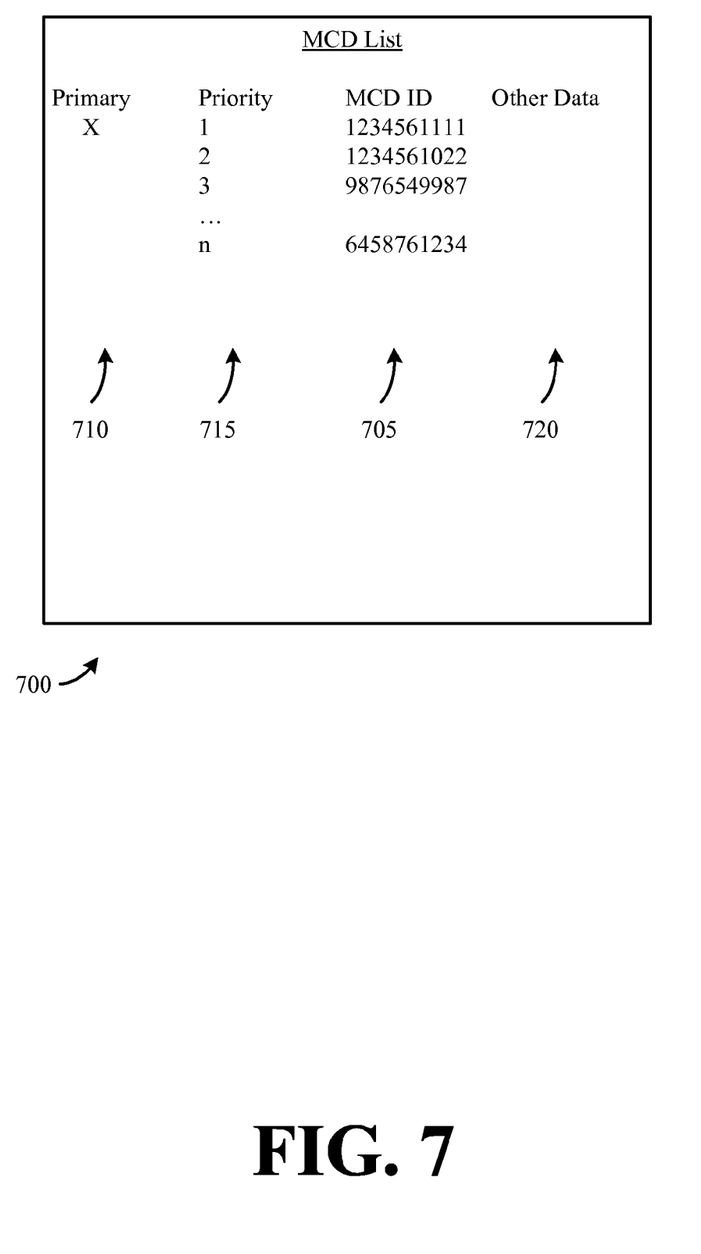
FIG. 7 is a block diagram of an example user to mobile communications devices registration list, according to an example embodiment of the invention.

FIG. 7 indicates a diagram of an example MCD registration and corresponding configuration data 700. As mentioned, the user to MCD registration may include, but is not limited to, a list of MCDs 705 associated with the user, a primary MCD designation 710, a forwarding prioritization designation 715, as well as any other data 720 that may be optionally utilized to implement the various embodiments described herein, such as may be available from the HLR of the wireless operator system.

The list of MCDs 705 may include a unique identifier of each MCD, such as, but not limited to, SIM data (e.g., IMSI, MSISDN or phone number, etc.), user-designated nickname, or any other unique identifier. It is appreciated that a user is not required to register every MCD owned and utilized. Moreover, in some instances, MCDs that are registered and associated with the user may not be owned or managed by the user but may still be available to receive forwarded calls or messages. For example, the user may additionally designate other friends', family members', or colleagues' MCDs to which incoming calls and/or messages are to be forwarded. This may be particularly useful when the user knows he or she will be with a particular person or that a particular person is likely to have better service for handling and responding to incoming calls or messages. The primary MCD designation 710 and forwarding prioritization designations 715 may be accomplished in any number of ways, including, but not limited to, entry by the user, taking the order of entry as a default designation, type of MCD, type of account, etc.

According to some embodiments, though not shown here, additional configuration rules may be provided by the user (and/or wireless operator system), such as, but not limited to, time of day restrictions designating certain MCDs for receiving forwarded calls at certain times of the day; rate plan restrictions limiting forwarding calls based on rate plan types, rate plan capabilities, etc.; minutes used restrictions limiting forwarding based on minutes used for each MCD; incoming number restrictions limiting or prohibiting forwarding from designated incoming numbers; wireless operator or service provider restrictions forwarding based on service provider; geographical restrictions limiting forwarding to certain MCDs only when in certain geographical regions; roaming restrictions limiting or prohibiting forwarding when MCDs are roaming; activity status methods preferences (e.g., using accelerometer, power off, etc.); voice call preferences (e.g., voice calls to be forwarded only to designated MCDs, or no voice calls to be forwarded to designated MCDs); message preferences (e.g., messages to be forwarded only to designated MCDs, or no messages to be forwarded to designated MCDs); and the like.

Moreover, a user and/or the wireless system operator may alter the MCD registration association list 700 at any time, such as over the Internet, over the telephone, in person, at a kiosk, etc. Accordingly, the MCD registration association list 700 may be utilized by the wireless operator system to identify the MCDs associated with a user and to determine which MCD calls or messages are to be forwarded.

With continued reference to FIG. 4, following block 405 is block 410, which begins the periodic operations of the call and message forwarding module to analyze and indicate the MCD to receive forwarded calls or messages. At block 410, the wireless operator system receives MCD activity data from one of a user's associated MCDs. According to one embodiment, MCD activity data may be actual activity status (e.g., active/inactive or on/off, etc.) that has been determined by the MCD and communicated to the wireless operator system. In other embodiments, MCD activity data may include raw activity-related data transmitted from the user's MCD (or otherwise associated with the MCD) that is utilized and analyzed by the wireless operator system to determine the activity status of the MCD. Various operations for determining MCD activity status are described in more detail with reference to FIG. 5.

The wireless operator system will utilize the received MCD activity data to update stored designations of the user's MCDs' activity statuses. Accordingly, by this embodiment, the wireless operator system changes MCD activity statuses upon receiving MCD activity data from a user's MCD. It is appreciated that, in other embodiments, the wireless operator system may be configured for frequent polling at predefined intervals to update the MCD activity statuses and may not wait to receive input from individual MCDs. According to another embodiment, MCD activity status determinations may be performed in real-time or near real-time upon receiving an incoming voice call or message for one of a user's listed MCDs, at which time the MCDs' activity statuses are determined by the MCD and/or by the wireless operator system.

Following block 410 is decision block 415, in which the wireless operator system determines whether the MCD activity data received at block 410 indicates that the corresponding MCD is active or inactive. If the MCD activity data indicates that the corresponding MCD is active, and if the MCD activity status for that MCD already indicates active, then nothing is performed, and the wireless operator continues to monitor for MCD activity data indicating an inactive MCD at block 420. Otherwise, the activity status is updated to active for that MCD. However, if it is determined at decision block 415 that the corresponding MCD is inactive, then operations proceed to blocks 425-465 to determine the activity statuses of the other MCDs associated with the user (or otherwise update the activity statuses) and to designate to which MCD (or MCDs) incoming voice calls or messages should be forwarded if the originally intended MCD is inactive.

At blocks 425-430, the wireless operator system retrieves the list of MCDs associated with the user and determines the activity status of all of the MCDs associated with the user. This allows the wireless operator system to apply the call and message forwarding rules to designate which active MCD the incoming calls or messages are to be forwarded if the originally intended MCD has indicated an inactive status.

For example, according to one embodiment depicted by blocks 435-465, if it is determined at decision block 435 that no MCD associated with the user is active, then incoming voice calls are to be sent to a voicemail account associated with the user and incoming messages (or message availability notifications) are to be sent to the originally intended MCD at block 440. If, however, it is determined at decision block 435 that at least one MCD is active, operations continue to decision block 445.

At decision block 445, if only one MCD associated with the user to receive incoming voice calls or messages is active, then incoming calls and messages are to be sent to the one active MCD at block 450. If, at decision block 445, it is determined that more than one MCD associated with the user are active, then operations continue to blocks 455-465 to either implement call forwarding MCD prioritization or to not forward calls or messages at all.

At decision block 455, if it is determined that MCD prioritization should be applied, which may be set as a user configured preference, a system setting, etc., then block 460 follows. At block 460, the wireless operator system designates the highest priority active MCD as the MCD to which incoming calls and messages are to be forwarded if the originally intended MCD is inactive. If prioritization is not activated, then block 465 follows, in which no calls or messages are forwarded to other MCDs. In some instances, it may be desirable not to forward an incoming call or message to a different MCD than was originally intended if multiple MCDs are active because the user may be actively using the multiple MCDs and thus not wish calls to be forwarded. This may be a preference that is configurable by a user or the wireless operator system.

After any of blocks 440, 450, 460, or 465, operations may repeat back to block 420 to continue monitoring for updates in MCD activity statuses.

It is appreciated that, according to other embodiments, additional and/or different call and message forwarding logic may be implemented. For example, according to one embodiment, the wireless operator system may not first investigate whether the originally intended MCD is inactive before forwarding an incoming call or message, but instead simply forward calls or messages to the highest priority active MCD. This may be advantageous if the user always wants calls or messages to be sent to a designated MCD if active regardless of whether the originally intended MCD is active. In this embodiment, a user configurable preference may be set to always allow forwarding calls to one or more MCDs.

As another example, calls and/or messages may be forwarded to multiple MCDs, such as if multiple MCDs are active or if otherwise configured. In this example embodiment, a user may provide configuration preferences that indicate which, if any, of the registered MCDs may be configured as being "co-active" or available to receive calls with other MCDs. In one embodiment, a user may simply indicate multiple MCD forwarding and the system can be operable to forward to all or only active MCDs. In another embodiment, the user configuration may be more tailored to selecting or otherwise identifying which MCDs may be available as multiple MCDs to receive a single call or message. It is appreciated that calls may be forwarded to multiple MCDs, voicemails left for multiple MCDs, and/or message availability notifications sent to multiple MCDs.

Moreover, in any of the example embodiments described herein, calls may be forwarded in an unchanged voice format, or messages left that may either be forwarded in a voice format or in a transcribed format. A transcribed format may allow forwarding messages, such as SMS or MMS messages with the transcribed text as the body.

Accordingly, the example method 400 illustrates operations performed at least in part by a wireless operator system to determine to which MCD or MCDs calls and/or messages should be forwarded when received. The outcome of the method 400 depends in part on activity data or activity status determinations provided by each of the user's registered and associated MCDs. The method discussed with reference to FIG. 6 below describes in more detail the operations of handling and forwarding incoming calls and messages based on the determinations made by the method 400.

FIG. 5 illustrates a flow diagram of an example method 500 for determining the activity status of an MCD, according to one embodiment. The operations of this method may be performed, at least in part, by an activity status module of an MCD, such as an MCD 104 described with reference to FIGS. 1 and 3. It is appreciated that, according to other embodiments, some of the operations and/or the MCD activity status determinations may be performed at least in part by a wireless operator, such as by a call and message forwarding module 150 of the wireless operator system 102 described with reference to FIGS. 1-2. In this initial example embodiment described herein, the operations are described as being performed by programmed logic contained on an MCD and subsequently communicated to a wireless operator system for use to facilitate dynamic call and message forwarding.

The method 500 may begin at block 505, in which the programmed logic of an MCD is executed to begin determining the MCD activity status. According to various embodiments, the operations of the method 500 may be automatically performed at periodic intervals, such as by a background polling process (e.g., a daemon process, etc.). In other embodiments, the operations of the method 500, or at least a portion thereof, may be performed in response to the occurrence of an event. Events that may cause the MCD to analyze its activity status may include, but are not limited to, user input, motion detection, expiration of a timer operation, location movement, messaging transmitted to and/or received from a wireless network (e.g., mobile IP registration or deregistration events, etc.), a polling activity status inquiry received from a wireless network, and the like.

Following block 505, any one or more of decision blocks 510, 525, 540, 555, 570 may be performed, according to various embodiments. In one example embodiment, only one of the decision blocks 510, 525, 540, 555, 570 may need to be performed in order to determine the final MCD activity status. Though, in other embodiments, more than one of the decision blocks 510, 525, 540, 555, 570 may be performed, such as if a combination approach is utilized to analyze the activity status of the MCD, whereby multiple activity status indicators may be analyzed before a conclusive determination of an active or inactive status is reached. It is appreciated that any of decision blocks 510, 525, 540, 555, 570 may be performed in any sequence, and that the sequence illustrated by FIG. 5 and described herein is not to be constraining.

At decision block 510, motion data from an accelerometer data can be analyzed to determine whether the MCD is active. Motion data from an on-board accelerometer can indicate whether the MCD is moving or has moved. For example, programmed logic can record accelerometer motion data to determine whether the accelerometer has recorded any movement of the MCD within a predetermined period of time (e.g., 30 minutes, 60 minutes, 120 minutes, etc.). In some embodiments, the MCD programmed logic may periodically invoke the accelerometer assembly to record accelerometer motion data or other responses from the accelerometer. If motion data has been recorded, or otherwise can be indicated, within the predetermined period of time, then it may be determined that the MCD is active and an activity indicator is set to active at block 515. If motion data has not been recorded or otherwise indicated within the predetermined period of time, then it may be determined that the MCD is inactive and an activity indicator is set to inactive at block 520.

According to some embodiments, the predetermined time period parameters (or other accelerometer preferences) may be configurable. For example, an MCD user may configure the period of time over which accelerometer activity is to be analyzed to determine the MCD activity status. As an example, some users may often leave their MCD stationary (e.g., at a desk, etc.) even though it is still in use, and thus they may prefer to extend the period of time analyzed before inactivity is concluded. Other users may be quite mobile and wish to shorten the period of time analyzed before inactivity is concluded, assuming that an MCD that is inactive even for a short period of time must not be in use. In another example, an MCD user may indicate that one or more of the other activity status determination techniques at blocks 525, 540, 555, 570 may be performed in addition to analyzing accelerometer data to provide confirmation of the MCD activity status. According to various embodiments, users may update these MCD preferences via a user interface or over a network, such as over the Internet via a web-based interface that will subsequently update the MCD programmed logic over the air. In yet other embodiments, personnel at the wireless operator, MCD device manufacturers, or MCD software providers may configure these thresholds.

Other techniques for analyzing accelerometer data and/or operations may be utilized to determine MCD activity data, according to various other embodiments. For example, in one embodiment, the MCD programmed logic, when determining the activity status of the MCD, may invoke the accelerometer assembly and analyze any resulting motion data. If motion is detected at that time by the accelerometer, then the MCD activity status indicator may be set to active at block 515. Otherwise, accelerometer data that does not indicate motion at the time it is invoked may simply be determined to be inconclusive—the MCD may be active and in use by the user, but sitting still at the instant time the accelerometer is polled. In these instances, either subsequent accelerometer readings may be analyzed, such as initially described to detect accelerometer movement within a predetermined period of time, or other techniques may be performed for determining the MCD activity status, such as at blocks 525, 540, 555, 570. Furthermore, it is appreciated that not all MCDs are operable with accelerometer assemblies, and thus other techniques for determining MCD activity status may be performed.

At decision block 525, user input activity is analyzed to determine MCD activity status. For example, recent user input to the MCD may indicate that the MCD is active and in use by the user. Infrequent user activity may, in some cases, indicate that the MCD is inactive and thus not in use. Any number of means may be utilized to assess user input activity, according to various embodiments. In one embodiment, existing processing log files may be analyzed by the MCD programmed logic. In another embodiment, new logs may be generated in response to user input and saved for subsequent, periodic analysis. These logs may be analyzed over a predetermined period of time, much like the accelerometer motion data, to determine whether user input has been provided to the MCD during that period of time. In yet another embodiment, a timer may be initiated or restarted each time user input is received. The timer may be configured to initiate an activity update (e.g., from active to inactive) if after a predetermined period of time no additional user input was received. Upon the MCD analyzing the user input data, if user input is received within a threshold period of time, then the MCD activity status is set to active at block 530. If no user input is received within the threshold period of time, then the MCD activity status is set to inactive at block 535. The predetermined period of time for analyzing user input may also be configured by the users, the wireless operators, the MCD device manufacturers, or MCD software providers similar to that described with reference to blocks 510-520.

At decision block 540, GPS (or any other location-based system) data is analyzed to determine whether the MCD location has changed over time, which may be utilized to indicate MCD activity status, according to one embodiment. As described with reference to FIG. 3, many MCDs include GPS receivers that allow receiving and analyzing GPS location data. In other embodiments, instead of GPS services, an MCD may include or otherwise be operable with other location-based systems such as, but not limited to, control plane locating utilizing delays from the most proximate communication point to the MCD, GSM localization utilizing multilateration of signals between communication points and the MCD, and near location-based services utilizing local-range technologies, such as Bluetooth, WLAN, infrared, near field communication technologies, etc. Similar to accelerometer motion data described with reference to block 510, changes in location data may indicate that the MCD is mobile and thus active, or, contrarily, no recent changes in location data may indicate that the MCD is inactive and not in use.

Accordingly, if a change in location has been recorded, or otherwise can be indicated, within a predetermined period of time, then it may be determined that the MCD is active, and an activity indicator is set to active at block 545. If no change in location can be detected within the predetermined period of time, then it may be determined that the MCD is inactive and an activity indicator is set to inactive at block 550. Other techniques for analyzing GPS or other location-based services data similar to those described with reference to block 510 may be utilized, such as analyzing GPS location data for changes at a certain instant, initiating or resetting a timer based upon each change in GPS location data, and the like. It is appreciated, however, that a change in location data, or no change in location data, may not reliably indicate the activity status of the MCD. Thus, in some embodiments, GPS data or other location-based services data may be utilized in combination with other activity status techniques, such as may be performed at decision blocks 510, 525, 555, 570. The predetermined period of time for analyzing GPS or other location-based services data may also be configured by the users, the wireless operators, the MCD device manufacturers, or MCD software providers similar to that described with reference to blocks 510-520. Furthermore, it is appreciated that not all MCDs are operable with GPS receivers or include other location-based services, and thus other techniques for determining MCD activity status may be performed.

At decision block 555, mobile IP deregistration (or registration) data can be analyzed to assess the MCD activity status. According to some embodiments, an MCD may be configured with mobile IP operability, which will transmit an IP deregistration message to the network when idle for a predetermined period of time (typically 90 minutes, but may be any predetermined period of time) to terminate the mobile IP session with the network. Accordingly, the same or similar operations to generate the IP deregistration message can be utilized to set an inactivity indicator at block 565. Likewise, until an IP deregistration message is generated, the activity status indicator may be set to active at block 560. According to other embodiments, other network communications may be utilized, such as messaging and updates performed when switching between two different networks (e.g., registration with a foreign agent, deregistration, etc.) or changes between communication points (e.g., cellular towers, etc.). Accordingly, the MCD programmed logic may be configured to monitor mobile IP deregistration and/or other network communications to assess the MCD activity status.

At decision block 570, the operation of powering off an MCD can be utilized to update an MCD activity status. For example, according to one embodiment, when performing power off operations, the MCD may set an activity status indicator to inactive at block 580 and subsequently transmit an activity status update message to the wireless service provider (at block 590 described below) prior to actually powering the device off. An MCD may be powered off in response to any number of events, such as, but not limited to, user input, a timer, low battery, loss of service, inactivity (according to other preferences, network, or device configuration), and the like. Any one or more of these events may trigger a change in the activity status at block 580. Likewise, though not illustrated here for simplicity, upon powering on an MCD, the activity status indicator may be reset at block 575 to indicate the MCD is active. Thus, after an MCD is turned on and until the MCD is powered off, or until any of the preceding methods indicate a change in MCD activity, the MCD activity status indicates the MCD is active.

Following any of the preceding blocks 510-580 is block 585, in which the activity status indicator or indicators are analyzed to make a final determination of the MCD activity status for communicating to the wireless operator system. According to various embodiments, any one or a combination of the preceding activity status determinations at blocks 510, 525, 540, 555, 570 may dictate the final activity status. For example, according to one embodiment, if at least one of the activity status indicators is set to active (e.g., motion, change in location, user input, powering on, etc.), then the final MCD activity status is determined to be active at block 585. In another embodiment, if at least one of the activity status indicators is set to inactive (e.g., no motion, no location change, user input, mobile IP deregistration, powering off, etc.), then the final MCD activity status is determined to be inactive at block 585. Although, in other embodiments, certain activity indicators may be given priority over others such that if there are conflicting activity status indicators, the higher priority indicator controls the final MCD activity status determination. For example, an activity status indicator set to inactive at block 580 as a result of powering off the MCD at block 570 may control the MCD activity status, regardless of whether accelerometer motion data or GPS data was previously collected within the predetermined time period or if user input was recently received. As another example, accelerometer motion data or GPS data may result in an activity indicator set to active, though the lack of user input for a predetermined period of time may result in an activity indicator set to inactive. In this example, the MCD may be configured to a preference of user input, or the lack thereof, over motion or location change data, resulting in the final MCD activity status determination of inactive, notwithstanding the movement of the MCD. Any other combination of activity status indicators may be utilized, according to various other embodiments, any of which may be configurable by the users, the wireless operators, the MCD device manufacturers, or MCD software providers in a similar manner as that described with reference to blocks 510-520.

Following block 585, after having determined the final MCD activity status, is block 590, in which the activity status is transmitted to the wireless operator system. Activity status may be transmitted according to any number of communications protocol, such as, but not limited to, TCP-IP, SMTP, etc. The activity status messaging may be included with pre-existing messaging that is conventionally communicated between MCDs and a wireless operator, or as new messaging provided for the purpose of sending activity statuses. MCD activity data can then be analyzed or otherwise utilized by the wireless operator server, such as the call and message forwarding module, to set or update activity statuses of each of the user's MCDs and to subsequently forward incoming calls or messages accordingly.

Following block 590 is block 595, in which the operations of the method 500 optionally repeat back to block 505 to continue to monitor and update the activity status of the MCD. According to one embodiment, the MCD may include programmed logic that causes automatic periodic activity status monitoring, such as every set number of seconds, minutes, etc. In other embodiments, the MCD programmed logic may be configured to determine activity status in response to an external event, such as a status inquiry message received from a wireless operator system, or an event that triggers a change in the activity status (e.g., power on or power off, accelerometer movement, etc.). The operations of the method 500 may be performed for each of the user's MCDs that are registered with the wireless operator system to provide the wireless operator system current activity status information for each of the MCDs.

As discussed, while the operations of the above-described example are performed at least in part by programmed logic on an MCD, in other embodiments, at least a portion of the above operations may be performed by a wireless operator system. For example, in one embodiment, raw activity data is obtained by the MCD (and optionally stored) and subsequently transmitted to a wireless operator system for analysis and to set corresponding MCD activity status indicators. For example, an MCD may include programmed logic configured to communicate motion data from an accelerometer assembly or location change data from a GPS receiver to a wireless operator system when or after it is generated. Similarly, mobile IP deregistration or power off messages can be communicated to the wireless operator system. Accordingly, instead of activity status indicators being updated by the MCD, a wireless operator system can perform similar analyses and thresholding to set activity status indicators upon receipt of the raw activity data as that described with reference to blocks 510-580.

FIG. 6 illustrates a simplified flow diagram of an example method 600 for forwarding an incoming call or message to an MCD based at least in part on the activity statuses of a user's multiple MCDs, according to one embodiment. The operations of this method may be performed, at least in part, by a wireless operator system, such as by a call and message forwarding module 150 of the wireless operator system 102 described with reference to FIGS. 1-2.

The method 600 may begin at block 605, in which an incoming call or message is received, which is originally intended to be sent to an MCD of a user who has multiple associated MCDs and subscribes or otherwise uses the call and message forwarding service. The incoming call or message can be received according to any conventional wireless communication protocol. Upon receipt of the incoming call or message, and prior to routing it to the user's originally intended MCD (e.g., the user's phone number to which the call or message is directed), the wireless operator system determines if the originally intended MCD is active or inactive at decision block 610. The MCD activity status may be determined according to any one or more of the techniques described with reference to FIG. 5 and designated by the method described with reference to FIG. 4. If the originally intended MCD is active (e.g., the MCD activity status for that MCD is set to active or the MCD is polled to determine its activity status is active), then operations continue to block 615 in which the incoming call or message is delivered to that MCD as originally intended according to conventional wireless communication protocol.

However, if at decision block 610 it is determined that the originally intended MCD is inactive (e.g., the MCD activity status for that MCD is set to inactive or the MCD is polled to determine its activity status is inactive), then blocks 620-625 follow. At block 620, the wireless operator system determines which MCD (or MCDs) to which the incoming call or message is to be forwarded. According to one embodiment, the MCD to which calls or messages are to be forwarded is determined and set in a status table periodically, such as if the operations described with reference to FIG. 4 are performed periodically to independently determine and set the MCD to which calls or messages are to be forwarded. In another embodiment, the wireless operator system may perform some or all of the operations described with reference to FIG. 4, such as at least blocks 430-465, upon receipt of an incoming call or message to determine in real-time or near real-time to which of the user's multiple MCDs the call or message is to be forwarded. Upon determining which MCD the call or message is to be forwarded, the wireless operator system forwards the call or message at block 625 accordingly. The method 600 may therefore end after block 625, having forwarded an incoming call or message upon receipt if the originally intended MCD is indicated as inactive.

It is appreciated that in some instances an incoming call or message may not be forwarded, even if the originally intended MCD is inactive. For example, no MCDs may be indicated as active, upon which the call or message may be directed to the originally intended MCD for leaving a voicemail or displaying a message availability notification (for subsequent message retrieval by the MCD according to conventional wireless messaging protocol). In other embodiments, even if no MCDs are indicated as active, the wireless operator system may be configured to deliver the incoming call or message according to priority rankings or any other logic, which may result in the incoming call or message delivered to a different MCD than the originally intended MCD, even if both are inactive. In some embodiments, a voicemail or message availability notification may be sent to more than one MCD, such as if being sent to the originally intended MCD and to the highest priority MCD if different than the originally intended MCD, or if multiple "co-active" MCDs are indicated in the user preferences and/or system configurations and a voicemail or message availability notification may be sent to each "co-active" MCD. It is appreciated that any number of forwarding rules and resulting combinations may be provided as desired, and that the preceding examples are not intended to be limiting.

Accordingly, embodiments of the systems and methods described herein provide techniques for dynamically handling and forwarding incoming calls or messages from an inactive MCD to one or more active MCDs. Doing so serves to minimize the configuration and activation efforts required of the users by dynamically identifying active and inactive statuses of MCDs without requiring user interaction. Moreover, embodiments of the systems and methods described herein provide advanced logic that allows more intelligent handling and configuration of call or message forwarding rules.

Various block and/or flow diagrams of systems, methods, apparatus, and/or computer program products according to example embodiments are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special purpose computer or other particular machine, a processor, or other programmable data processing apparatus to produce a particular machine, such that the instructions that are executed on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that are executed on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for forwarding wireless communications, comprising:
    storing, by a wireless operator system comprising one or more computers, associations between a plurality of mobile communications devices ("MCDs") and a user;
    determining, by the wireless operator system, that at least one of the plurality of MCDs is inactive and that at least one of the plurality of MCDs is active based at least in part on activity data associated with the plurality of MCDs;
    receiving an incoming call or message intended for the at least one inactive MCD;
    if only one of the plurality of MCDs is active, causing, by the wireless operator system, the incoming call or message to be forwarded to the one active MCD based at least in part on the determination; and
    if more than one of the plurality of MCDs is active, either:
        (a) causing, by the wireless operator system, the incoming call or message to be forwarded to at least one of the active MCDs based at least in part on the determination or (b) not causing the incoming call or message to be forwarded based at least in part on the determination.

2. The method of claim 1, comprising, if more than one of the plurality of MCDs is active, causing the incoming call or message to be forwarded to one of the active MCDs.

3. The method of claim 1, comprising, if more than one of the plurality of MCDs is active, causing the incoming call or message to be forwarded to each of the active MCDs.

4. The method of claim 1, wherein at least a portion of the plurality of MCDs is designated for receiving forwarded messages based on input from the user.

5. The method of claim 1, wherein determining that at least one of the plurality of MCDs is active and that at least one of the plurality of MCDs is inactive further comprises receiving the activity data from at least a portion of the plurality of MCDs.

6. The method of claim 1, comprising, if more than one of the plurality of MCDs is active, causing the incoming call or message to be forwarded to one of the active MCDs having a highest priority, wherein each of the plurality of MCDs is associated with a forwarding priority.

7. The method of claim 1, wherein the activity data comprises at least one of: (a) accelerometer data; (b) global positioning system data; (c) an amount of delay in user input activity; (d) mobile IP deregistration data; or (e) power off data.

8. The method of claim 1, further comprising:
    determining a change in an activity status of one or more of the plurality of MCDs;
    receiving at least one additional incoming call or message subsequent to determining the change in the activity status; and
    determining whether the at least one additional wireless message is to be forwarded to one or more of the plurality of MCDs based on the change in the activity status.

9. A non-transitory computer-readable media comprising computer program instructions which when executed by at least one mobile communications device (MCD) processor associated with a first MCD cause the at least one MCD processor to:
    identify activity data associated with the first MCD;
    determine a first activity status of the first MCD based at least in part on the activity data, the first activity status identifying whether the first MCD is inactive or active;
    cause transmission of the first activity status to a wireless operator system for forwarding incoming calls or messages based at least in part on the first activity status; and
    receive, from the wireless operator system, information associated with at least one respective second activity status for at least one second MCD;
    wherein, when the information indicates that the first MCD has the only active status among the at least one second MCD, receive an incoming call or message that was intended for an MCD of the at least one second MCD having an inactive status; and
    wherein, when the information indicates that the first MCD and at least one of the at least one second MCD have an active status, receive the incoming call or message that was intended for the MCD having the inactive status, or not receive the incoming call or message that was intended for the MCD having the inactive status.

10. The non-transitory computer-readable media of claim 9, wherein the activity data comprises at least one of: (a) accelerometer data; (b) global positioning system (GPS) data; (c) an amount of delay in user input activity; (d) mobile IP deregistration data; or (e) power off data.

11. The non-transitory computer-readable media of claim 9, wherein the activity data comprises an accelerometer activity indicator, wherein when an accelerometer associated with the MCD does not record a change over a predefined time period, the computer program instructions cause the at least one MCD processor to indicate the accelerometer activity indicator as inactive.

12. The non-transitory computer-readable media of claim 9, wherein the activity data comprises a GPS activity indicator, wherein when a GPS module associated with the MCD does not record a change over a predefined time period, the computer program instructions cause the at least one MCD processor to indicate the GPS activity indicator as inactive.

13. The non-transitory computer-readable media of claim 9, wherein the activity data comprises a user input activity indicator, wherein when the MCD does not receive user input over a predefined time period, the computer program instructions cause the at least one MCD processor to indicate the user input activity indicator as inactive.

14. The non-transitory computer-readable media of claim 9, wherein the activity data comprises an IP deregistration activity indicator, wherein when the MCD issues IP deregistration data, the computer program instructions cause the at least one MCD processor to indicate the IP deregistration activity indicator as inactive.

15. The non-transitory computer-readable media of claim 9, wherein the activity data comprises a power off activity indicator, wherein when the MCD is powered off, the computer program instructions cause the at least one MCD processor to set the power off activity indicator to inactive.

16. The non-transitory computer-readable media of claim 9, wherein the activity data comprises a power off activity indicator, wherein when associated with the MCD powering off, the computer program instructions cause the at least one MCD processor to determine that the activity status is inactive and transmit at least one of the activity status or a power off message to the wireless operator system.

17. The non-transitory computer-readable media of claim 9, wherein, when determining the activity status, the computer program instructions cause the at least one MCD processor to determine that the activity status is active if at least one of the one or more activity status indicators is set to active.

18. The non-transitory computer-readable media of claim 9, wherein the activity data comprises a plurality of activity status indicators, and wherein, when determining the activity status, the computer program instructions cause the at least one MCD processor to determine the activity status based on at least a portion of the plurality of activity status indicators.

19. The non-transitory computer-readable media of claim 9, wherein the computer program instructions cause the at least one MCD processor to repeat the identifying, determining, and transmitting operations periodically to transmit updated activity statuses.

20. A system for forwarding wireless communications, comprising:
at least one server comprising one or more computer processors and a call and message forwarding module, wherein the call and message forwarding module is operable to:
associate a plurality of mobile communications devices (MCDs) with a user;
determine that at least one of the plurality of MCDs is inactive based at least in part on activity data associated with the plurality of MCDs;
determine that at least one of the plurality of MCDs is active based at least in part on the activity data;
receive notification of an incoming call or message intended for the at least one inactive MCD;
if only one of the plurality of MCDs is active, cause the incoming call or message to be forwarded to the one active MCD based at least in part on the determination that at least one of the plurality of MCDs is active; and
if more than one of the plurality of MCDs is active, either (a) cause the incoming call or message to be forwarded to at least one of the active MCDs based at least in part on the determination that at least one of the plurality of MCDs is active or (b) not cause the incoming call or message to be forwarded based at least in part on the determination that at least one of the plurality of MCDs is active.

* * * * *